United States Patent
Zhuang et al.

(10) Patent No.: US 9,009,404 B2
(45) Date of Patent: Apr. 14, 2015

(54) VIEWING COMPRESSION AND MIGRATION STATUS

(75) Inventors: Peiyu Zhuang, Shanghai (CN); Yuanjie Wu, Shanghai (CN); Yue Zhao, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 201 days.

(21) Appl. No.: 12/959,575

(22) Filed: Dec. 3, 2010

(65) Prior Publication Data

US 2012/0005423 A1    Jan. 5, 2012

(30) Foreign Application Priority Data

Jun. 30, 2010    (CN) .......................... 2010 1 0213824

(51) Int. Cl.
G06F 3/06    (2006.01)
(52) U.S. Cl.
CPC ............ *G06F 3/0608* (2013.01); *G06F 3/0647* (2013.01); *G06F 3/0653* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 2006/0020753 A1* | 1/2006 | Cochran et al. | 711/114 |
| 2008/0168473 A1* | 7/2008 | Armstrong et al. | 719/318 |
| 2008/0195948 A1* | 8/2008 | Bauer | 715/719 |
| 2010/0306500 A1* | 12/2010 | Mimatsu | 711/209 |

* cited by examiner

*Primary Examiner* — Duc Doan
(74) *Attorney, Agent, or Firm* — Krishnendu Gupta; Jason A. Reyes; John T. Hurley

(57) ABSTRACT

A method for use in viewing compression and migration status is disclosed. A logical volume is selected for compression into a compressed logical volume. A destination storage pool for the compressed logical volume is selected. The logical volume is compressed during migration of the logical volume to the destination pool. Unified status information of progress of the compression and migration is presented. A system for use in viewing compression and migration status is also disclosed.

20 Claims, 6 Drawing Sheets

CLI SCREENSHOT naviseccli –h 10.32.177.228 bind r5 10 –rg 0 –sp a –cap 20 ← 510 naviseccli –h 10.32.177.228 compression –on –l 10 –destpoolid 0 ← 520 naviseccli –h 10.32.177.228 compression –list –l 10 ← 530

LOGICAL UNIT NUMBER :10  ← 540
NAME: LUN 10
UID: 60:06:01:60:02:F0:21:00:18:72:68:CA:CC:6C:DF:11
DESTINATION POOL ID: 0
CURRENT STATE: MIGRATING
STATUS: OK(0x0)
PERCENT COMPLETE: 2
RATE: MEDIUM
TOTAL CAPACITY (BLOCKS): 41943040
TOTALCAPACITY (GBs): 20.000
CONSUMED CAPACITY (BLOCKS): 41943040
CONSUMED CAPACITY (GBs): 20.000

FIG. 5

VIEWING COMPRESSION AND MIGRATION STATUS

BACKGROUND

1. Technical Field

This application relates to viewing compression and migration status.

2. Description of Related Art

A traditional storage array (which may also be referred to herein as a "disk storage array", "disk array", "storage system", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Host computers (which may also be referred to herein as "hosts", "server computers", or simply "servers") may access data by sending access requests to the one or more storage arrays. Some storage arrays require that the access requests identify units of data to be accessed using logical volume ("LUN" or "LU") and block addresses that define where the units of data are stored on the storage array. Such storage arrays are known as "block I/O" storage arrays. In some block I/O storage arrays, the logical volumes presented by the storage array to the host correspond directly to physical storage devices (e.g., disk drives) on the storage array, so that the specification of a logical volume and block address specifies where the data is physically stored within the storage array. In other block I/O storage arrays (referred to as intelligent storage arrays), internal mapping techniques may be employed so that the logical volumes presented by the storage array do not necessarily map in a one-to-one manner to physical storage devices within the storage array. Nevertheless, the specification of a logical volume and a block address used with an intelligent storage array specifies where associated content is logically stored within the storage array, and from the perspective of devices outside of the storage array (e.g., a host) is perceived as specifying where the data is physically stored.

The block I/O storage array keeps track of the logical unit to physical unit associations in a map. The map associates a host logical unit address with a physical device address. The size of the elements in the map is the coarseness of the map. A map that only has a few entries of large extents is a course grain map. A map that has many entries with small extents is a fine grain map. A fine grain map allows more flexibility but generally is too large for all of it to be contained in memory at once. It is possible to use different mapping granularities for different data to achieve a variety of space/performance trade offs.

Performance of a storage array may be characterized typically by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Thin provisioning is a mechanism that applies to large-scale centralized computer disk storage systems, storage area networks (SANs), and storage virtualization systems. Thin provisioning allows space to be easily allocated to servers, on a just-enough and just-in-time basis. The term thin-provisioning is used in contrast to fat provisioning that refers to traditional allocation methods on storage arrays where large pools of storage capacity are allocated to individual applications, but remain unused.

For example, in a storage consolidation environment, where many applications are sharing access to the same storage array, thin provisioning may allow administrators to maintain a single free space buffer pool to service the data growth requirements of all applications. With thin provisioning, storage capacity utilization efficiency can be automatically increased without heavy administrative overhead. Organizations can purchase less storage capacity up front, defer storage capacity upgrades in line with actual business usage, and save the operating costs associated with keeping unused disk capacity spinning.

Thin provisioning enables over-allocation or over-subscription. Over-allocation or over-subscription is a mechanism that allows server applications to be allocated more storage capacity than has been physically reserved on the storage array itself. This allows flexibility in growth and shrinkage of application storage volumes, without having to predict accurately how much a volume will grow or contract. Physical storage capacity on the array is only dedicated when data is actually written by the application, not when the storage volume is initially allocated.

The thin provisioning technology reduces the waste of storage capacity by preventing allocation of storage capacity to an unwritten data area.

SUMMARY OF THE INVENTION

A method for use in viewing compression and migration status is disclosed. A logical volume is selected for compression into a compressed logical volume. A destination storage pool for the compressed logical volume is selected. The logical volume is compressed during migration of the logical volume to the destination pool. Unified status information of progress of the compression and migration is presented. A system for use in viewing compression and migration status is also disclosed.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is a command line interface screenshot of an embodiment that may be used in connection with viewing compression and migration status.

DETAILED DESCRIPTION OF EMBODIMENT(S)

In an embodiment, the current technique may be used in viewing compression and migration status. In at least some implementations, the technique may be used for viewing a unified compression and compression-initiated migration status in a database management system. In some embodiments, use of the technique may allow for the compression of any logical unit in a data storage system in one step, thus, providing a consistent user interface for all types of logical units. This may facilitate data compression management specifically, and database management generally, by requiring less knowledge of the underlying database system on the part of database managers and users.

Figure 1:
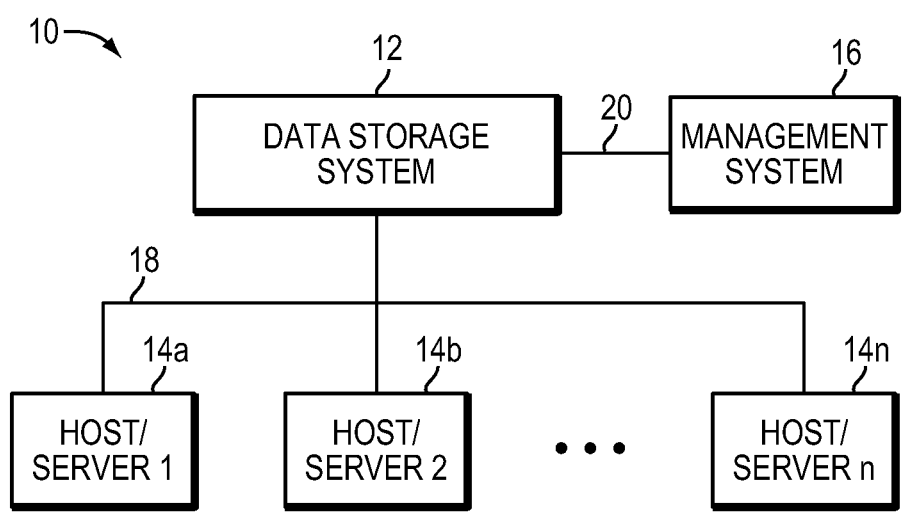
FIG. 1 is diagram of an example embodiment of a storage system that may be used in connection with viewing compression and migration status.

Referring to FIG. 1, shown is an example of an embodiment of a system that may be used in connection with performing one or more implementations of the technique described herein. The system 10 includes one or more data storage systems 12 connected to server or host systems 14a-14n through a communication medium 18. The system 10 also includes a management system 16 connected to one or more data storage systems 12 through communication medium 20. In this embodiment of the computer system 10, the hosts 14a-14n may access the data storage systems 12, for example, in performing input/output (I/O) operations or data requests. The communication medium may be any one or more of a variety of networks or other type of communication connections as known to those skilled in the art. The communication mediums 18 and 20 may be a network connection, bus, and/or other type of data link, such as a hardwire or other connections known in the art. For example, the communication medium may be the Internet, an intranet, network or other wireless or other hardwired connection(s) by which the host systems 14a-14n may access and communicate with the data storage systems 12, and may also communicate with other components (not shown) included in the system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel (FC), iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite. In one embodiment, the hosts 14a-14n may communicate with the data storage systems 12 over an iSCSI or a Fibre Channel connection and the management system may communicate with the data storage systems 12 over a separate network connection using TCP/IP. It should be noted that although FIG. 1 illustrates communications between the hosts 14a-14n and data storage systems 12 being over a first connection, and communications between the management system 16 and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, in some embodiments, display information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more physical devices, not shown, upon which data is stored. The data storage devices may include one or more types of data storage devices such as, for example, one or more disk drives and/or one or more solid state drives (SSDs).

The appliance may include software used in connection with storing the data of the hosts on the appliance and also software used in connection with configuring and provisioning the data storage for use by the hosts in connection with the embodiments of the current techniques. Also consistent with embodiments of the current techniques is software that may be used in connection with synchronized data compression and migration. Methods that may be used in connection with performing data storage configuration, configuration and provisioning tasks, and the synchronized compression and migration of data are described in more detail in following paragraphs in order to provide ease of use to customers of the data storage systems 12.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment. In such an embodiment in which element 12 of FIG. 1 is implemented using one or more data storage systems, each of the data storage systems may include code thereon for performing the techniques as described.

In some embodiments, servers or host systems, such as 14a-14n, provide data and access control information through channels to the storage systems, and the storage systems may also provide data to the host systems also through the channels. Data in a single storage system may be accessed by way of LUNs by multiple hosts allowing the hosts to share the data residing therein. Data storage devices may also be configured using other logical device layers on top of LUNs, which are then exposed to the host or other component using the configured data storage.

Figure 2:
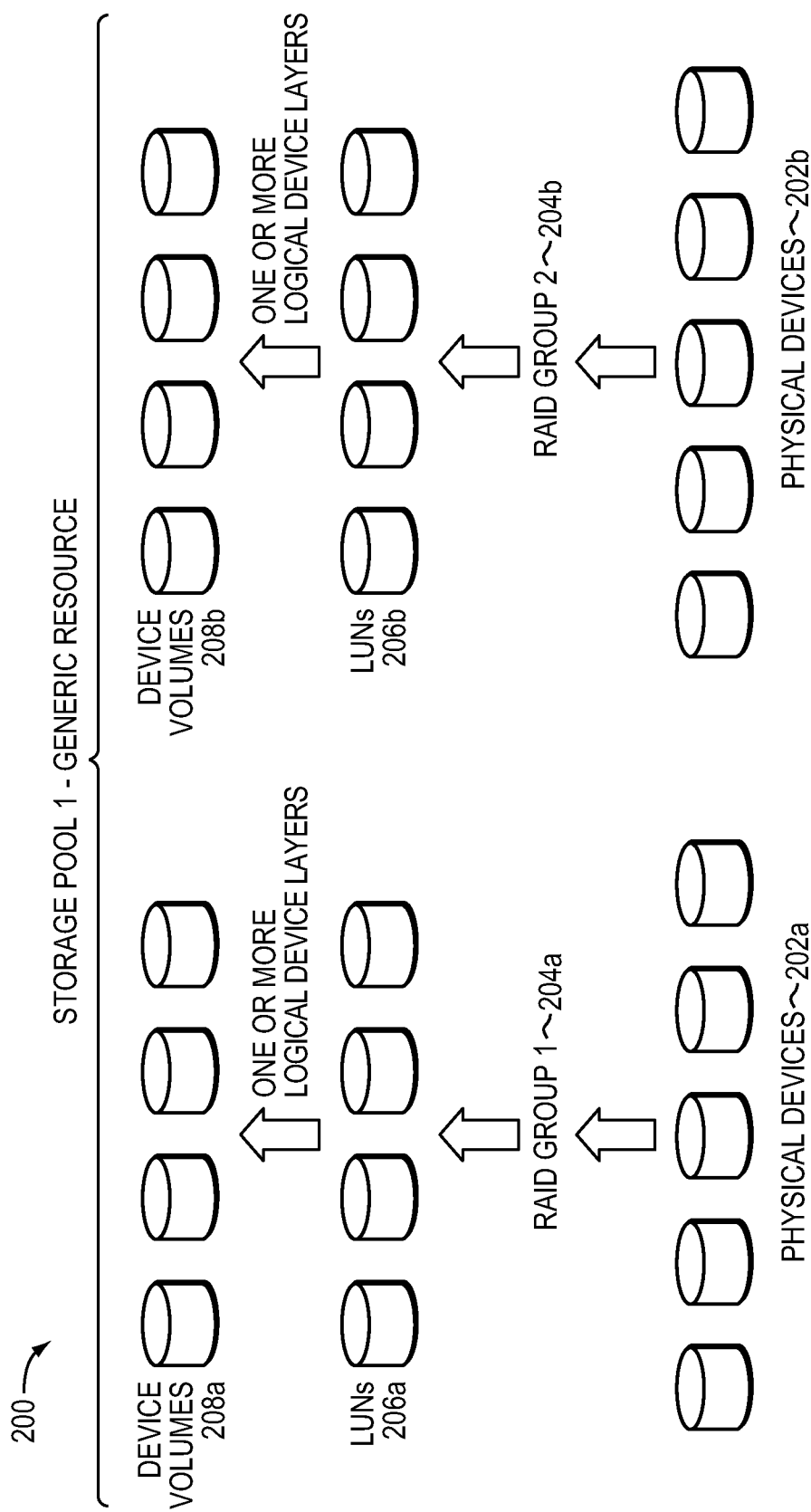
FIG. 2 is a schematic representation of a storage pool that may be used with a storage system of FIG. 1.

FIG. 2 illustrates an example embodiment of the current techniques representing how data storage systems 12 may construct storage pools from groups of physical data storage devices. For example, RAID Group 1 204a may be formed from physical devices 202a. In certain embodiments, the data storage system best practices of a policy may specify the particular RAID level and configuration for the type of storage pool being formed. For example, for physical devices 202a on a first data storage system type when forming a high performance storage pool, RAID-5 may be used in a 4+1 configuration (e.g., 4 data drives and 1 parity drive). The RAID Group 1 204a may provide a number of LUNs 206a. An embodiment may also utilize one or more additional logical device layers on top of the LUNs 206a to form one or more logical device volumes 208a. In at least some embodiments, additional logical device layers may be used and may vary with the data storage system. In at least some embodiments, there may not be a 1:1 correspondence between the LUNs of 206a and the volumes of 208a. In other embodiments, device volumes 208b may be formed or configured from physical devices 202b. Storage pool 200 of the example embodiment of FIG. 2 illustrates two RAID groups being used to define a single storage pool. In alternative embodiments, one or more RAID groups may be used for forming a storage pool using RAID technology.

In some embodiments, the data storage systems may define how to configure or form the generic storage pools, where each storage pool may have an associated generic storage pool type. The embodiment of FIG. 2 illustrates one methodology or framework that may be used to form storage pools in an embodiment.

In some embodiments, the storage pools may be used for one or more purposes, including, for example, for a thin provisioning program or driver (also referred to as a mapped LUN driver), not shown, to provide a volume realized by thin provisioning (thin LUN volume: TLU) to the host computers 14a-14n. In some embodiments, the ability to assign an unused storage area of a storage pool to TLUs, which helps avoid the drawbacks presented by over-allocated LUNs, makes TLUs an efficient storage alternative for fully-provisioned LUNs and may be particularly useful in connection with data compression in comparison to fully-provisioned LUNs.

In the following paragraphs, reference may be made to a particular embodiment such as, for example, an embodiment in which element 12 of FIG. 1 utilizes traditional LUNs and TLUs as described above. However, it will be appreciated by those skilled in the art that this is for purposes of illustration and should not be construed as a limitation of the techniques herein.

Described in the following paragraphs are techniques that may be used for providing a consistent interface for compression of all types of logical units. However, the described applications and implementations are only examples; the techniques herein may be adaptable to other applications and components and/or to the particular knowledge level of the user.

Generally, compression schemes in storage systems can increase the system's effective capacity by using software processes to help eliminate or reduce excess space in data so the same amount of data can be stored using less physical space. Various methods of compression may be available and well known to those skilled in the art. In a particular embodiment, the user may be provided with an interface that displays compression as an attribute of a LUN. In this embodiment, the user may also be able to manage various compression operations related to the LUN. The embodiment may also provide a similar interface for migrating the LUN.

However, while data may be compressed directly, not all LUNs are directly compressible. For example, direct compression on a traditional LUN, which is a fully-provisioned LUN such as a FLARE LUN or a meta LUN, is usually not possible. Traditional LUNs have a defined size measured in physical blocks. Typically, when a traditional LUN is created with a desired size, the storage array allocates the exact number of physical blocks needed to attain that desired size on the physical disks within the storage array. If the traditional LUN is only partially used, the unused space may still be allocated and unavailable to the storage array. Under these circumstances there may be no way to free only this unused space of the traditional LUN and direct compression on the LUN may not be achieved.

In accordance with embodiments of the current techniques, a LUN that cannot be directly compressed may be migrated from its current location to a target location and the data may be compressed during migration or after the data arrives at the target location. As mentioned above, implementations of the data storage systems and the various communication connections may vary with each particular embodiment. Migration may take place within a single data storage system, within a SAN or network-attached storage (NAS) environment, between systems remotely located at widely-displaced geographical locations, or between any other systems within a particular data network or networks. In some embodiments, the data storage systems may be implemented in such a way as to allow background data migration—enabling the data storage systems to remain online to continue servicing data requests. In alternative embodiments, the data storage system or systems may be taken offline or data request servicing may be temporarily suspended to effectuate data migration and compression.

Conventional compression of a traditional LUN may first require migration of the traditional LUN to a TLU. Once such migration was completed, the user could compress the TLU. Conventionally, the progress statuses of both migration and compression would be separately displayed to the user through different interfaces or commands. For instance, a user would conventionally obtain status information by commands specific to migration and commands specific to compression. A request for such migration status of a LUN would display the migration status, but would not display the status of a concurrent or scheduled compression process. In alternative conventional techniques, the user may compress the LUN during migration to the TLU. Yet, the status information of such migration and compression would still be displayed separately upon separate migration and compression commands.

On the other hand, some types of LUNs may be compressed without the need to perform additional tasks such as migration. Thus, for example, conventionally a user of a database management system may be faced with different interfaces for different types of LUNs depending on whether the LUN could be directly compressed or whether the additional step of migration is needed.

In an embodiment of the current technique, users are able to compress any type of LUN, including a traditional LUN, in one step, thereby providing a consistent user interface regardless of the type of LUN being compressed.

Figure 3:
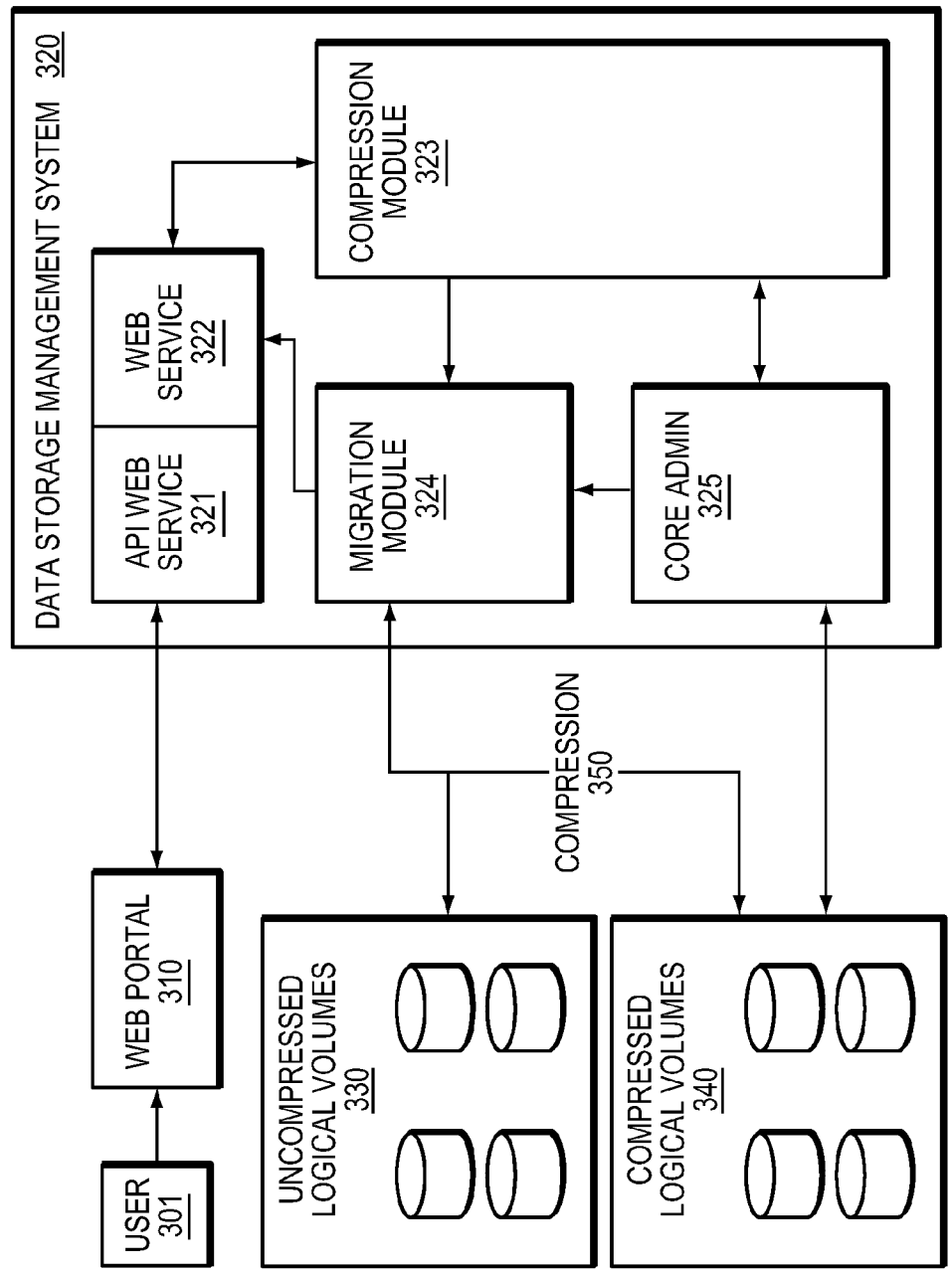
FIG. 3 are schematic representations of components that may be used in connection with a storage system of FIG. 1.

Referring to FIG. 3, shown is a block diagram of a client-server network embodiment of the current techniques. Web portal 310 presents a user interface (UI) for a user 301 of the network via a terminal screen and keyboard at a single point of control in the network. Interactive components such as system dialog, edit, and check boxes may be presented on the screen which the user can configure and with which the user can interact. Data storage management system 320 (also shown and described in connection to the embodiment of FIG. 1 as element 16) is operatively coupled to web portal 310 through API web service 321. Data storage management system 320 provides capabilities for the management and monitoring of logical volumes 330 and 340, which, in this embodiment, represent uncompressed and compressed logical volumes respectfully. Data storage management system 320 includes migration module 324 and compression module 323, both which provide for various functionalities including data migration and compression, and core admin 325, which allows the compression and migration modules to issue various commands to other various underlying modules.

Figure 4:
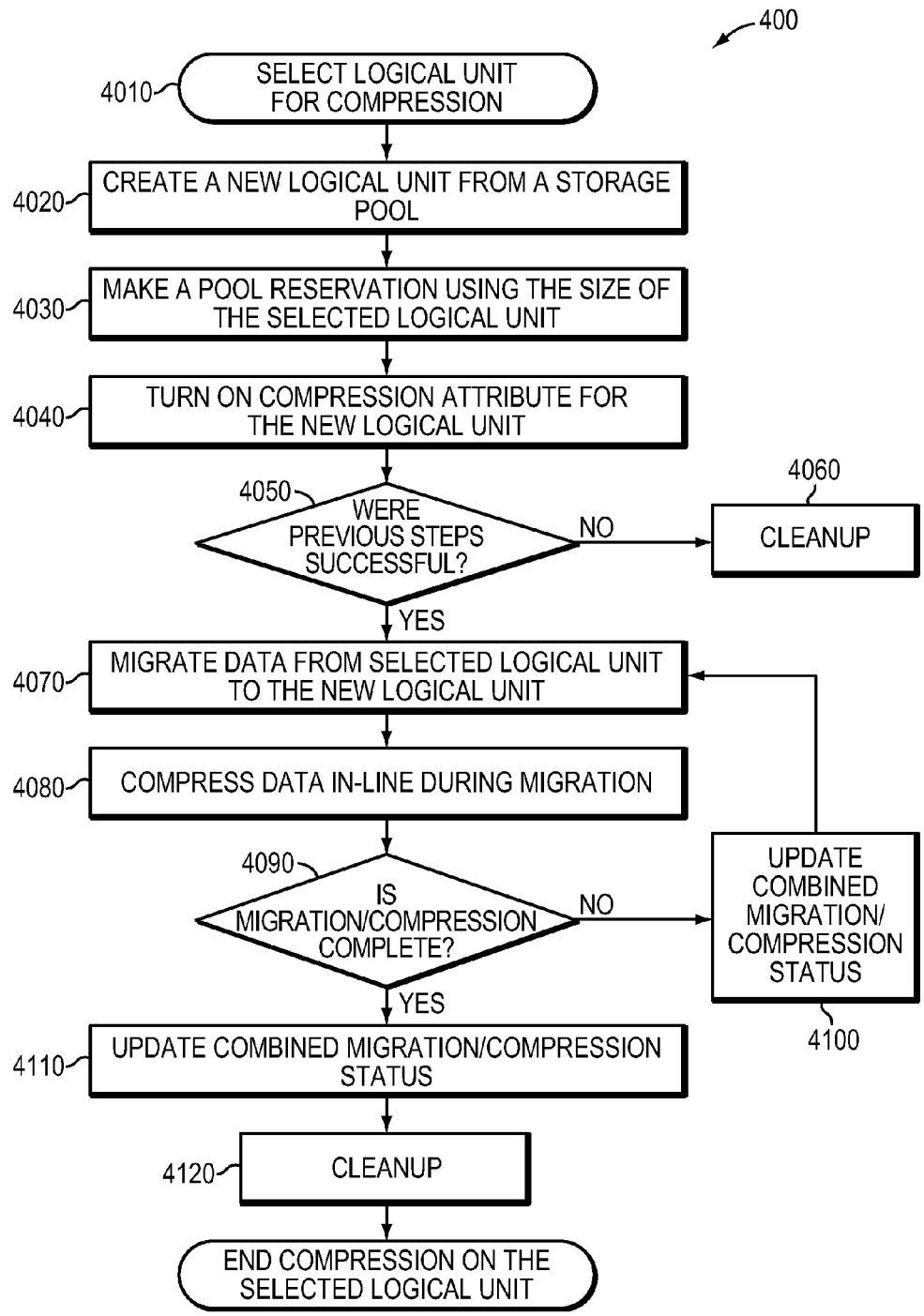
FIG. 4 is a flowchart of a procedure for use with the embodiments of FIGS. 1-3.

Referring to the embodiment of FIG. 4, shown is a flowchart depicting the steps involved within a network as illustrated in FIG. 3 in achieving an embodiment of the current techniques. Description of the steps in flowchart 400 will be provided with reference to the block diagram in FIG. 3. Compression may be initiated by user 301 or automatically by computer software (not shown). In FIG. 300, user 301 may initiate compression on a logical unit located in logical volumes 330 by way of web portal 310, which operatively communicates with a data storage management system 320 such as EMC's Navisphere or Unisphere products. Navisphere provides a graphical user interface (GUI) and/or a command line interface (CLI), embodiments of which are provided in FIGS. 5 and 6. In accordance with an embodiment of the current techniques, if user 301 selects an uncompressed logical unit located in uncompressed logical volumes 330 that cannot be directly compressed (e.g., compression of a traditional LUN) (step 4010), the steps illustrated in flowchart 400 are performed.

In one embodiment of the current techniques, data stored on the traditional LUN located in uncompressed logical volumes 330 may be migrated to a TLU located in compressed logical volumes 340, compressing the data in the process 350. Initiation of the process causes the compression module 323 to utilize core admin 325 to first create a TLU from a storage pool (step 4020), such as the pool presented in FIG. 2. The storage pool may be selected by user 301 or selected automatically by computer software. Once the storage pool is selected, the core admin may make a pool reservation for the TLU, preferably, equal to the size of the traditional LUN (step 4030). The compression attribute of the TLU may then be activated by the core admin (step 4040).

In this embodiment, if steps 4020, 4030, and 4040 are successful, the core admin may initiate LUN migration of the traditional LUN located in uncompressed logical volumes 330 to the TLU located in compressed logical volumes 340 (step 4050). If steps 4020, 4030, and 4040 are unsuccessful, compression module 323 is responsible for cleanup or recovery (step 4060). Once the compression-initiated migration has begun, migration module 324 transfers data from the traditional LUN to the TLU (step 4070). While the traditional LUN data is migrated, migration-initiated writes of the traditional LUN data may be compressed in-line (step 4080). In some embodiments, the in-line compression may avoid overburdening the data storage system or systems by requiring only one read of the LUN data for the purpose of accomplishing both migration and compression rather than reading the data once for the purpose of migration and once more for the purpose of compression.

In at least some embodiments, the rate of migration may be no greater than the rate of compression. In some embodiments, the compression rate attribute may be adjusted through the compression module 323, which may then command the migration module to set the migration rate accordingly. For instance, if the rate of compression is increased, the migration rate may likewise be increased. Therefore, compression and migration may be synchronized so that compression and migration are completed simultaneously.

In some embodiments, both the compression module 323 and the migration module 324 report their respective status information back to the user 301 through the web service 322 (410). This may be done in a particular embodiment by polling hardware drivers responsible for compression and migration. In an embodiment of the current techniques, status updates may reoccur throughout the process of compression and compression-initiated migration, providing the user 301 with a continuous stream of up-to-date information pertaining to the compression and migration of the traditional LUN. With regards to an EMC Clariion system, a program such as Navisphere or Unisphere may provide these types of status updates to the user.

In an embodiment of the current technique, the synchronized migration and compression progress status may be presented to the user 301 as one unified set of status information such as a unified completion status. This can be achieved in particular embodiments by presenting to the user the synchronized migration and compression progresses as one combined compression progress. In this embodiment, the combined compression progress may be implemented by establishing an association between the different migration states and the different compression states. For instance, the different states of migration, such as STARTING, SYNCHRONIZING, TERMINATED, and TRESPASS, may be associated with the MIGRATING compression state.

Referring to the embodiment of FIG. 5, a CLI screenshot illustrating an embodiment of this technique is shown. In this embodiment, label 510 refers to a command entered into the CLI by a user to create a new traditional LUN. The next command, referenced by label 520, is entered by the user to initiate the compression process on the newly created LUN. Label 530 refers to a command entered by the user to instruct the system to print out a list of information pertaining to the compression on the newly created LUN. The list referenced by label 540 is then presented to the user. As can be seen in the list referenced by label 540, the user is informed that the system is currently compressing LUN 10 by way of migration as evidenced by the current migrating state, that the selected pool ID is 0, that the rate of compression is medium, and that the completion percentage is 2. In other words, the user is provided with both migration and compression information by entering one command.

Figure 6:
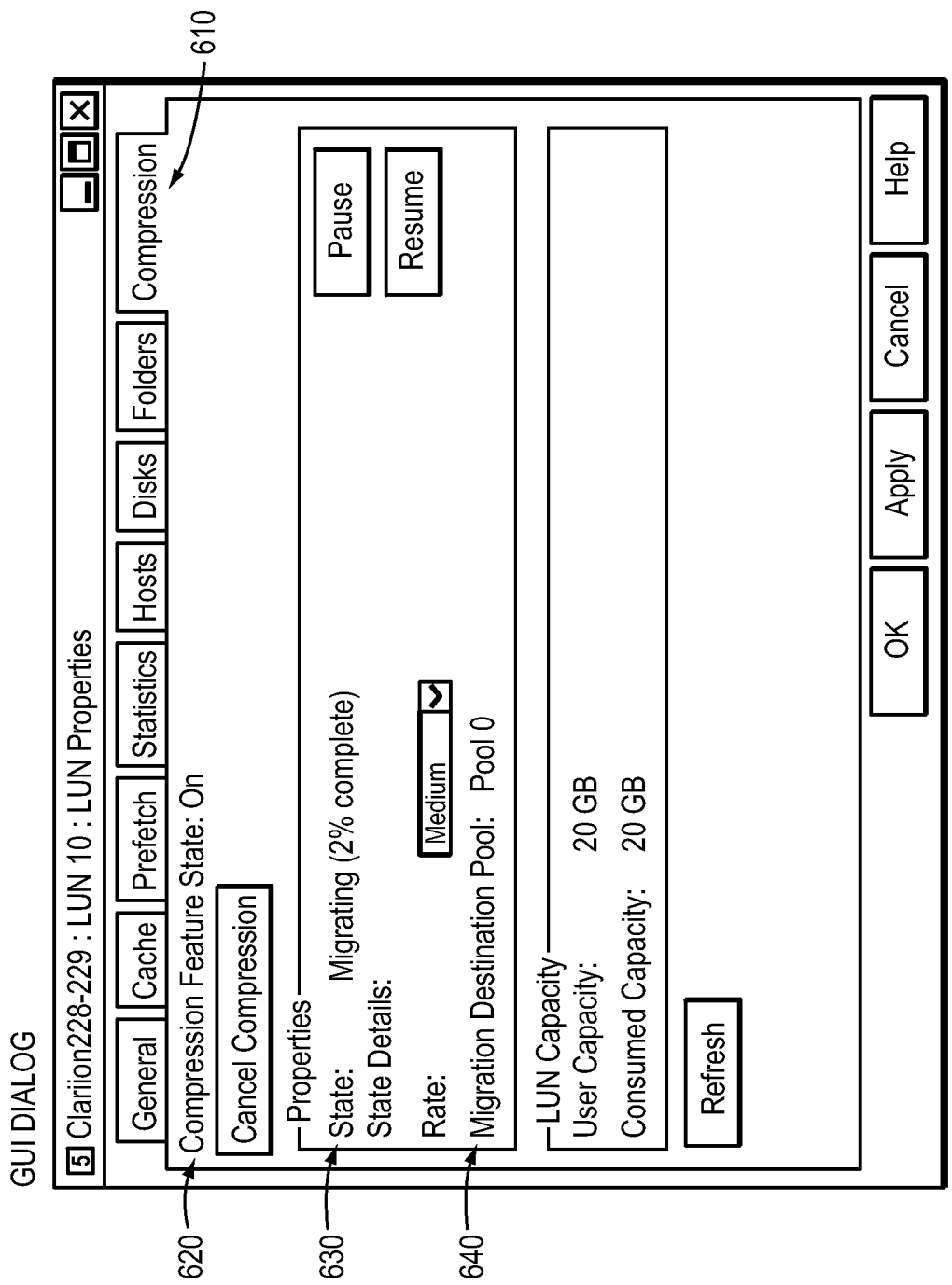
FIG. 6 is a graphical user interface screenshot of an embodiment that may be used in connection with viewing compression and migration status.

Referring to the screenshot provided in the embodiment of FIG. 6, a single GUI can also be used to easily present the same data as presented by the CLI embodiment as illustrated in FIG. 5. This screenshot provides an embodiment of a LUN management application screen for traditional LUN 10. By clicking on compression tab 610, a user is presented with compression-specific information for LUN 10. For instance, in this embodiment, the user is informed by element 620 that the LUN's compression feature is turned on. Additionally, the user is given the current state of compression at element 630, which shows that this particular LUN is compressing by way of migration and that the process has a completion percentage of 2. It can also be seen at element 640 that Pool 0 was selected as the migration destination pool. Thus, the user is provided with compression and migration information for LUN 10 through a single interface.

In some embodiments, when performing compression-initiated migration in connection with the current techniques, users may be prevented from managing either compression or migration separately to avoid unintended effects. Managing these features may be coordinated under these circumstances. In some embodiments, compression-initiated migrations may be distinguished from other migration processes initiated by the user or one or more systems. This may be achieved in a particular embodiment by a new session property representing the migration, which is displayed to the user as a reserved session. In this embodiment, the user may not be allowed to manage or fully manage these reserved sessions though a migration interface. Rather, these sessions may be managed through the compression interface and management would be effectuated by the compression module 323.

Referring again to the embodiment of FIG. 4, once the synchronized compression and migration processes are complete, a final status update is presented to the user (411). In one embodiment, a cleanup command is then sent to the compression module 323, which will then send a delete command to the migration module 324 to remove the migration session. As a result, the traditional LUN located in uncompressed logical volumes 330 is unbound leaving the data originally residing in the traditional LUN as compressed data in a TLU located in compressed logical volumes 340. The compression module 323 may then cancel the reservation for the TLU in the storage pool.

An embodiment may implement the techniques herein using code executed by a computer processor. For example, an embodiment may implement the techniques herein using code which is executed by a processor of the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in viewing compression and migration status, the method comprising:
   selecting a logical volume for compression into a compressed logical volume;
   selecting a destination storage pool for the compressed logical volume;
   compressing the logical volume in-line during migration of the logical volume to the destination pool; and
   presenting unified status information of progress of the in-line compression and migration during migration of the logical volume.

2. The method of claim 1 wherein a reservation is made in the destination storage pool for the compressed logical volume.

3. The method of claim 1 wherein the logical volume selected for compression is a traditional Logical Unit Number (LUN).

4. The method of claim 1 wherein the compressed logical volume is a Thin LUN Unit (TLU).

5. The method of claim 1 wherein the logical volume selected for compression is selected by a user.

6. The method of claim 1 wherein the logical volume selected for compression is selected by a computer.

7. The method of claim 1 wherein the destination storage pool is selected by a user.

8. The method of claim 1 wherein the destination storage pool is selected by a computer.

9. The method of claim 1 wherein compression and migration cannot be managed independently.

10. The method of claim 1 wherein a rate of migration is synchronized with the rate of compression.

11. The method of claim 1 wherein an association is established between migration states and compression states.

12. The method of claim 1 wherein the unified status information is obtained by polling.

13. The method of claim 1 wherein the unified status information comprises a unified completion percentage.

14. The method of claim 1 wherein the method is performed using a command line interface (CLI).

15. The method of claim 1 wherein the method is performed using a graphical user interface (GUI).

16. A system for use in viewing compression and migration status, the system comprising:
   first logic selecting a logical volume for compression into a compressed logical volume;
   second logic selecting a destination storage pool for the compressed logical volume;

third logic compressing the logical volume in-line during migration of the logical volume to the destination pool; and fourth logic presenting unified status information of progress of the in-line compression and migration during migration of the logical volume.

17. The system of claim 16 wherein a reservation is made in the destination storage pool for the compressed logical volume.

18. The system of claim 16 wherein compression and migration cannot be managed independently.

19. The system of claim 16 wherein an association is established between migration states and compression states.

20. The system of claim 16 wherein the unified status information comprises a unified completion percentage.

* * * * *